US012780483B2

(12) United States Patent
Lee et al.

(10) Patent No.: US 12,780,483 B2
(45) Date of Patent: Nov. 3, 2026

(54) WATER TANK

(71) Applicant: COWAY Co., Ltd., Gongju-si (KR)

(72) Inventors: Won Hyuk Lee, Gongju-si (KR); Yong Yeon Noh, Gongju-si (KR); Woo Jin Joo, Gongju-si (KR); Kihong Min, Gongju-si (KR); Min Suk Chang, Gongju-si (KR); Sang Bong Je, Gongju-si (KR)

(73) Assignee: COWAY Co., Ltd., Gongju-si (KR)

( * ) Notice: Subject to any disclaimer, the term of this patent is extended or adjusted under 35 U.S.C. 154(b) by 0 days.

(21) Appl. No.: 19/078,814

(22) Filed: Mar. 13, 2025

(65) Prior Publication Data

US 2025/0296722 A1 Sep. 25, 2025

(30) Foreign Application Priority Data

Mar. 19, 2024 (KR) ........................ 10-2024-0037567

(51) Int. Cl.
*B65D 1/26* (2006.01)
*B65D 1/46* (2006.01)
*B65D 43/02* (2006.01)
*C02F 1/00* (2023.01)

(52) U.S. Cl.
CPC ................. *B65D 1/26* (2013.01); *B65D 1/46* (2013.01); *B65D 43/0202* (2013.01); *B65D 2543/00194* (2013.01); *B65D 2543/00351* (2013.01); *B65D 2543/00398* (2013.01); *B65D 2543/00518* (2013.01); *B65D 2543/00546* (2013.01); *C02F 1/001* (2013.01); *C02F 2201/002* (2013.01)

(58) Field of Classification Search
CPC .......... B65D 11/26; B65D 11/24; B65D 1/26; B65D 1/46; B65D 1/42; B65D 1/44; B65D 43/0202; B65D 2543/00194; B65D 2543/00351; B65D 2543/00398; B65D 2543/00407; B65D 2543/00416
USPC ................ 220/782, 780, 670, 669, 671, 645
See application file for complete search history.

(56) References Cited

U.S. PATENT DOCUMENTS

| | | | | |
|---|---|---|---|---|
| 3,474,928 A * | 10/1969 | Hurtt .................. | B65D 21/0219 206/508 |
| 4,574,974 A * | 3/1986 | von Holdt .......... | B65D 43/0208 220/782 |
| 8,066,149 B2 * | 11/2011 | Strange .................... | B65D 1/36 206/508 |
| 8,127,961 B2 * | 3/2012 | Vovan ................ | B65D 43/0206 220/780 |
| 2006/0261065 A1 * | 11/2006 | Claypool ............. | B65D 43/021 220/780 |

FOREIGN PATENT DOCUMENTS

| | | |
|---|---|---|
| KR | 10-2017-0022776 A | 3/2017 |
| KR | 10-2022-01 44535 A | 10/2022 |

* cited by examiner

*Primary Examiner* — Robert J Hicks
(74) *Attorney, Agent, or Firm* — Oblon, McClelland, Maier & Neustadt, L.L.P.

(57) ABSTRACT

A water tank includes a tank body having a tank body space formed therein; a tank cover to cover the tank body space and be coupled with the tank body; and a tank cover reinforcing part formed on the tank cover to reinforce rigidity of the tank cover. The tank cover includes a tank cover surface formed to be rounded so as to be convex in a direction opposite to the tank body space. Further, the tank cover reinforcing part can be formed to protrude on the tank cover surface.

15 Claims, 12 Drawing Sheets

WATER TANK

CROSS-REFERENCE TO RELATED APPLICATION(S)

This application claims priority to and the benefit of Korean Patent Application No. 10-2024-0037567, filed on Mar. 19, 2024, the disclosure of which is incorporated herein by reference in its entirety.

TECHNICAL FIELD

The present disclosure relates to a water tank, and more specifically to a water tank that is capable of preventing deformation due to the pressure of a fluid contained therein and capable of quantitative extraction.

RELATED ART

A water purifier refers to a device that receives raw water from the outside, filters the same, and supplies the same to the outside. With the improvement of living standards, water purifiers are widely used not only in commercial facilities but also in general homes.

Recently, water purifiers that can heat or cool purified water as well as provide hot or cold water have been developed and utilized. Such water purifiers do not require a separate treatment process to adjust the temperature of discharged purified water to a desired temperature, and thus, user convenience can be improved.

A water purifier that can provide hot or cold water can be configured to include a tank for receiving purified water. The purified water introduced into the tank can be heated or cooled and then supplied to the outside according to the user's request.

Meanwhile, if purified water introduced into the tank is arbitrarily exposed to the outside, there is a risk of contamination of the purified water. To this end, the tank is configured to be sealed except for a part where purified water is introduced and another part where the introduced purified water is cooled or heated and then discharged.

Therefore, if purified water is introduced into the tank or purified water stored in the tank is discharged to the outside, pressure changes may inevitably occur inside the tank. As the inflow and outflow of purified water proceed, the outer wall of the tank surrounding the space inside the tank may be damaged by repeated expansion and contraction due to the pressure change.

In this case, it is difficult to reliably seal the inside of the tank, which may cause contamination of the stored purified water. Furthermore, there is also a concern that the tank may be damaged and the stored purified water may leak out randomly, thereby causing the water purifier to malfunction.

Accordingly, a method is required to prevent damage to the tank despite pressure changes inside the tank that accommodates purified water to be generated as hot or cold water.

Korean Patent Laid-Open Publication No. 10-2017-002776 discloses an induction heating module. Specifically, it discloses an induction heating module that accommodates purified water in a space formed inside the first and second covers and heats the accommodated purified water through an induction heating module to generate hot water.

However, the induction heating module disclosed in the above related art document forms only one cover among a plurality of covers convexly outward, and forms a groove only in the cover. In addition, the shape of the cover of the induction heating module disclosed in the above related art document is intended to form a space for receiving purified water. The above related art document does not provide a method for preventing the cover from being deformed in shape due to pressure changes that occur when purified water flows in or out, and thus being damaged.

Korean Patent Laid-Open Publication No. 10-2022-0144535 discloses a water storage tank and a water purifier having the same. Specifically, it discloses a water storage tank configured such that a partial surface of the inner tank is formed as a curved surface such that the volume can change according to the inflow and outflow of water, and a water purifier having the same.

However, the inner tank disclosed in the above related art document assumes that it is accommodated in an outer tank and used. The above related art document does not provide a method for preventing an inner tank from being deformed in shape or damaged in response to a pressure caused by the inflow of purified water, when the inner tank is provided alone.

RELATED ART DOCUMENTS

Patent Documents

Korean Patent Laid-Open Publication No. 10-2017-0022776 (Mar. 2, 2017)

Korean Patent Laid-Open Publication No. 10-2022-0144535 (Oct. 7, 2022)

SUMMARY

The present disclosure has been devised to solve the above problems, and an object of the present disclosure is to provide a water tank having a structure that can prevent deformation due to the pressure of the fluid contained inside.

Another object of the present disclosure is to provide a water tank having a structure that can maintain a constant amount of fluid provided to the outside.

Still another object of the present disclosure is to provide a water tank having a structure that can prevent deformation without excessive structural changes.

Still another object of the present disclosure is to provide a water tank having a structure that can achieve the above objects without excessive increase in volume.

Still another object of the present disclosure is to provide a water tank having a structure that can minimize interference with other elements positioned in an installation space.

The problems of the present disclosure are not limited to the problems mentioned above, and other problems that are not mentioned will be clearly understood by those skilled in the art to which the present disclosure pertains from the description below.

According to one aspect of the present disclosure, provided is a water tank, including a tank body having a tank body space formed therein; a tank cover configured to cover the tank body space and be coupled with the tank body; and a tank cover reinforcing part formed on the tank cover to reinforce rigidity of the tank cover, wherein the tank cover includes a tank cover surface formed to be rounded so as to be convex in a direction opposite to the tank body space, and wherein the tank cover reinforcing part is formed to protrude on the tank cover surface.

In this case, the water tank may be provided, wherein the tank cover surface is formed to have a length in one direction and a width in the other direction, and wherein the tank cover reinforcing part includes a plurality of first tank cover reinforcing parts that are positioned at each corner of the one direction and the other direction of the tank cover surface.

In addition, the water tank may be provided, wherein the tank cover surface includes a pair of corners that extend in the one direction and another pair of corners that are continuous with the one pair of corners and extend in the other direction, and wherein the first tank cover reinforcing part is provided in two pairs, and each of the pair of corners and the other pair of corners are arranged adjacent to each other at a plurality of consecutive positions.

In this case, the water tank may be provided, wherein the first tank cover reinforcing part is formed such that a width thereof decreases in a direction toward a center of the tank cover at the plurality of locations.

In addition, the water tank may be provided, wherein the first tank cover reinforcing part is formed to protrude outwardly from the tank cover surface so as to be convex in a direction opposite to the tank body space.

In this case, the water tank may be provided, wherein the tank cover surface is formed to have a length in one direction and a width in the other direction, and wherein the tank cover reinforcing part includes a plurality of second tank cover reinforcing parts that are positioned at each corner of the one direction of the tank cover surface.

In addition, the water tank may be provided, wherein the second tank cover reinforcing part is formed to protrude outwardly from the tank cover surface so as to be convex in a direction opposite to the tank body space.

In this case, the water tank may be provided, wherein the second tank cover reinforcing part is provided in a pair, and the pair of second tank cover reinforcing parts are positioned adjacent to a center of each corner of the one direction of the tank cover surface.

In addition, the water tank may be provided, wherein the tank cover reinforcing part includes a third tank cover reinforcing part that is formed to protrude toward the tank body space on one side facing the tank body space among each side of the tank cover surface.

In this case, the water tank may be provided, wherein the tank body includes a tank body bottom surface facing the tank cover surface with the tank body space therebetween, and wherein the tank body bottom surface is formed to be rounded so as to be convex in a direction opposite to the tank body space.

In addition, the water tank may be provided, which further include a tank body reinforcing part formed on the tank body to reinforce rigidity of the tank body, wherein the tank body reinforcing part is formed to protrude from a tank body bottom surface.

In this case, the water tank may be provided, wherein the tank body reinforcing part includes a second tank body reinforcing part that is formed to protrude toward the tank body space on one side facing the tank body space among each side of the tank body bottom surface.

In addition, the water tank may be provided, which further include a tank body reinforcing part formed on the tank body to reinforce rigidity of the tank body, wherein the tank body includes a tank body side surface that extends at a predetermined angle with the tank body bottom surface and surrounds the tank body space, and wherein the tank body reinforcing part is formed to protrude on the tank body side surface.

In this case, the water tank may be provided, wherein the tank body reinforcing part includes a first tank body reinforcing part that is formed to protrude in opposition to the tank body space.

In addition, the water tank may be provided, wherein the tank body side surface includes a pair of surfaces that extend in one direction and another pair of surfaces that are continuous with the pair and extend in the other direction, and wherein the first tank body reinforcing part is formed on each of the pair of surfaces and extends in the one direction.

According to the above configuration, the water tank according to an embodiment of the present disclosure can prevent deformation due to the pressure of a fluid contained inside.

In addition, according to the above configuration, the water tank according to an embodiment of the present disclosure can maintain a constant amount of fluid provided to the outside.

In addition, according to the above configuration, the water tank according to an embodiment of the present disclosure can maintain a constant temperature of the fluid provided to the outside.

In addition, according to the above configuration, the water tank according to an embodiment of the present disclosure can prevent deformation without excessive structural changes.

In addition, according to the above configuration, the water tank according to an embodiment of the present disclosure can achieve the above objects without excessive increase in volume.

In addition, according to the above configuration, interference with other elements positioned in the installation space can be minimized.

The effects of the present disclosure are not limited to the above-described effects, and should be understood to include all effects that can be inferred from the configurations of the invention described in the detailed description or claims of the present disclosure.

DETAILED DESCRIPTION OF THE EMBODIMENTS

Figure 1:
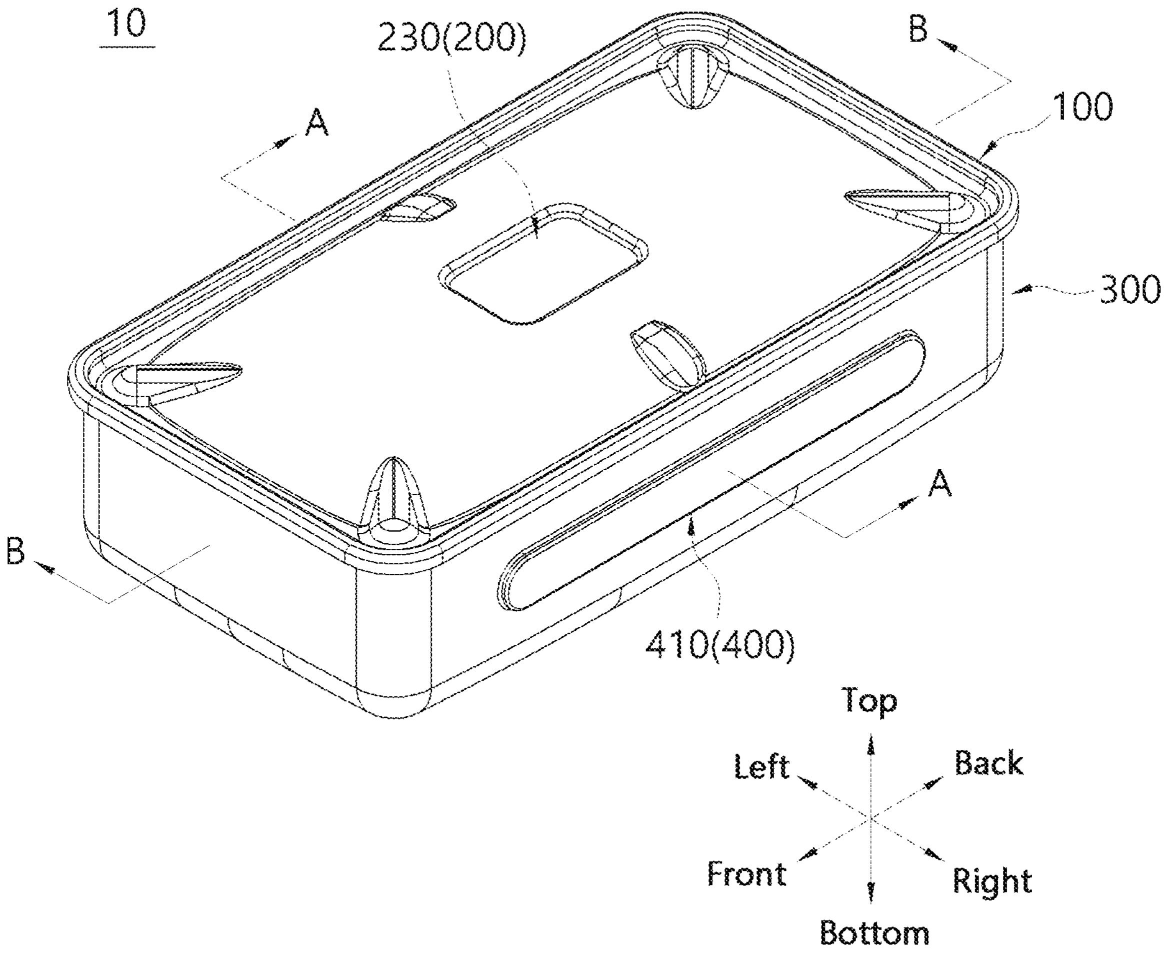
FIG. 1 is a perspective view illustrating a water tank according to an embodiment of the present disclosure.

Hereinafter, with reference to the attached drawings, embodiments of the present disclosure will be described in detail so that one of ordinary skill in the art to which the present disclosure pertains can easily practice the present disclosure. The present disclosure may be implemented in various different forms and is not limited to the embodiments described herein. In order to clearly explain the present disclosure, parts that are not related to the description in the drawings have been omitted, and the same reference numerals have been assigned to identical or similar components throughout the specification.

The words and terms used in the present specification and claims should not be interpreted as limited to their conventional or dictionary meanings, but should be interpreted as meanings and concepts that conform to the technical idea of the present disclosure according to the principle that the inventor can define terms and concepts in order to explain his or her invention in the best way.

Therefore, the embodiments described in the present specification and the configurations depicted in the drawings correspond to preferred embodiments of the present disclosure and do not represent all of the technical ideas of the present disclosure, and thus, the corresponding configurations may have various equivalents and modified examples that can replace the same at the time of filing of the present disclosure.

In the following description, the description of some components may be omitted in order to clarify the features of the present disclosure.

The term "fluid connection" used in the following description means that one or more members are connected to each other in a fluidic manner. In one embodiment, the fluid connection may be formed by members such as conduits, pipes and piping. In the following description, the fluid connection may be used in the same sense as "fluidically connecting" one or more members to each other.

The term "electrical conduction" used in the following description means that one or more members are connected to each other in a way that allows electric current or an electrical signal to be transmitted. In one embodiment, the electrical conduction may be formed in a wired form such as a conductor member or in a wireless form such as Bluetooth, Wi-Fi or RFID. In one embodiment, the electrical conduction may include the meaning of "communication."

The term "fluid" used in the following description means any form of material that flows by an external force and can be transformed in shape or volume. In one embodiment, the fluid may be a liquid such as water or a gas such as air.

The term "protrusion" used in the following description means that it is formed to be more protruding than other parts. In one embodiment, the term "protrusion" may include the meaning of "protruding."

The terms "upper", "lower", "left", "right", "front" and "back" used in the following description shall be understood with reference to the coordinate system illustrated throughout the accompanying drawings.

Figure 2:
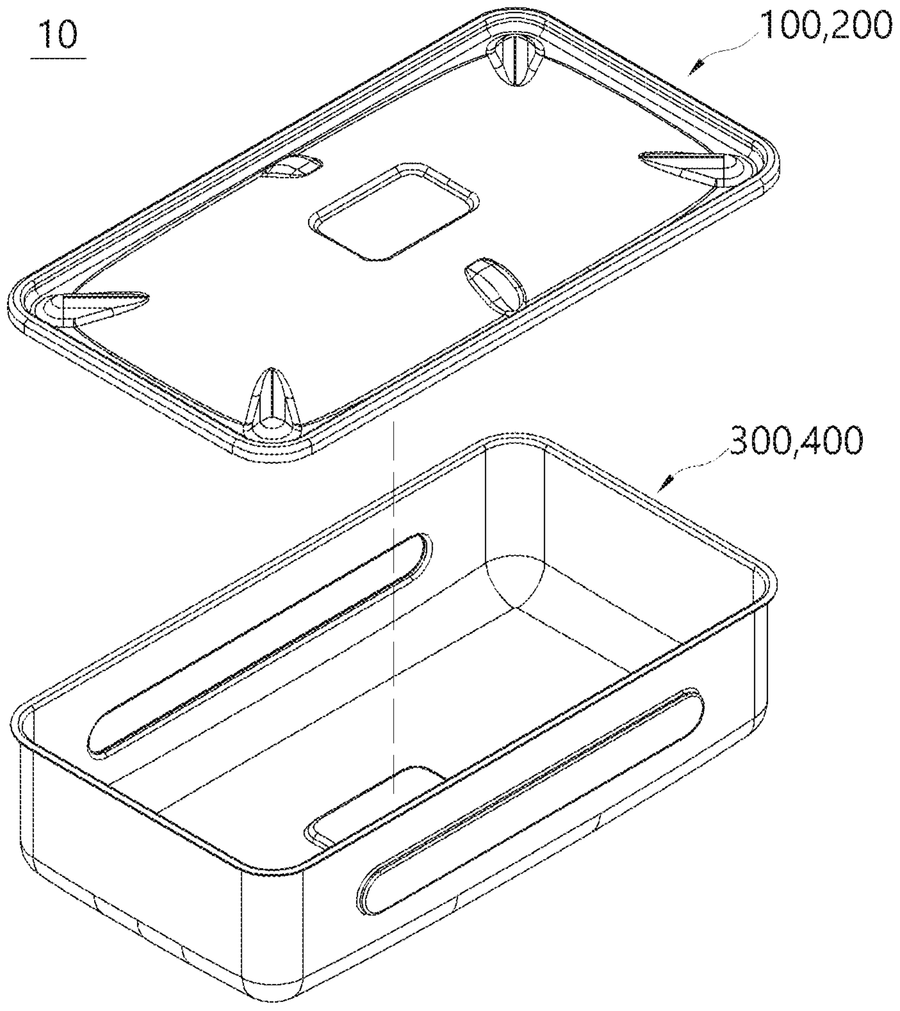
FIG. 2 is an exploded perspective view illustrating the configuration of the water tank of FIG. 1.
Figure 3:
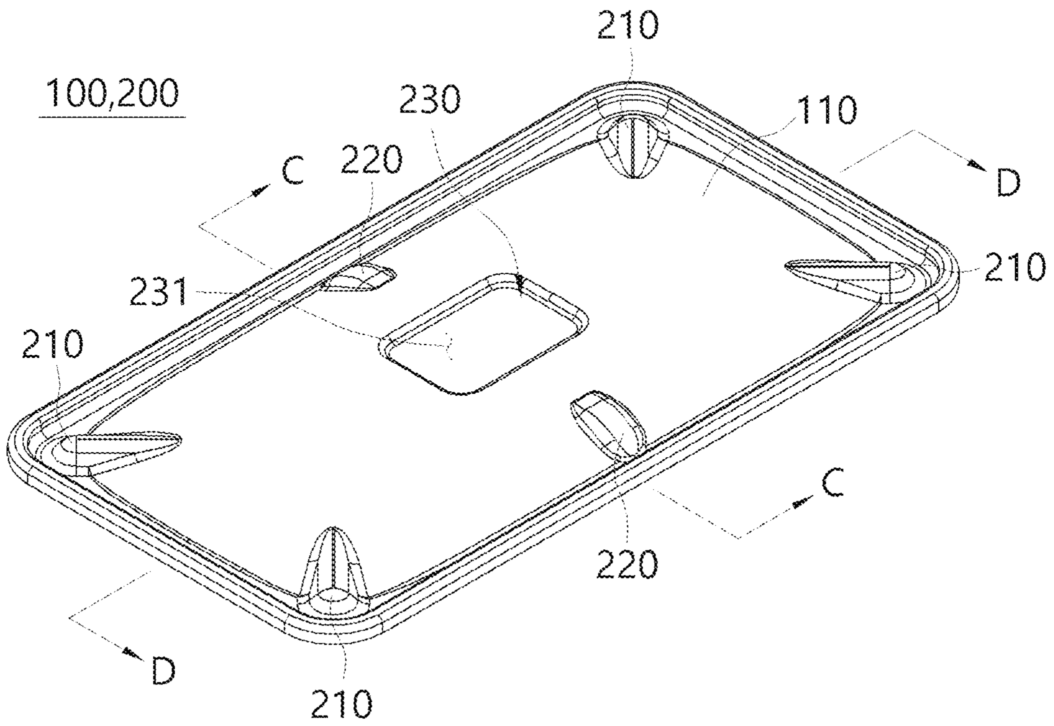
FIG. 3 is a perspective view illustrating a tank cover and a tank cover reinforcing part provided in the water tank of FIG. 1.
Figure 4:
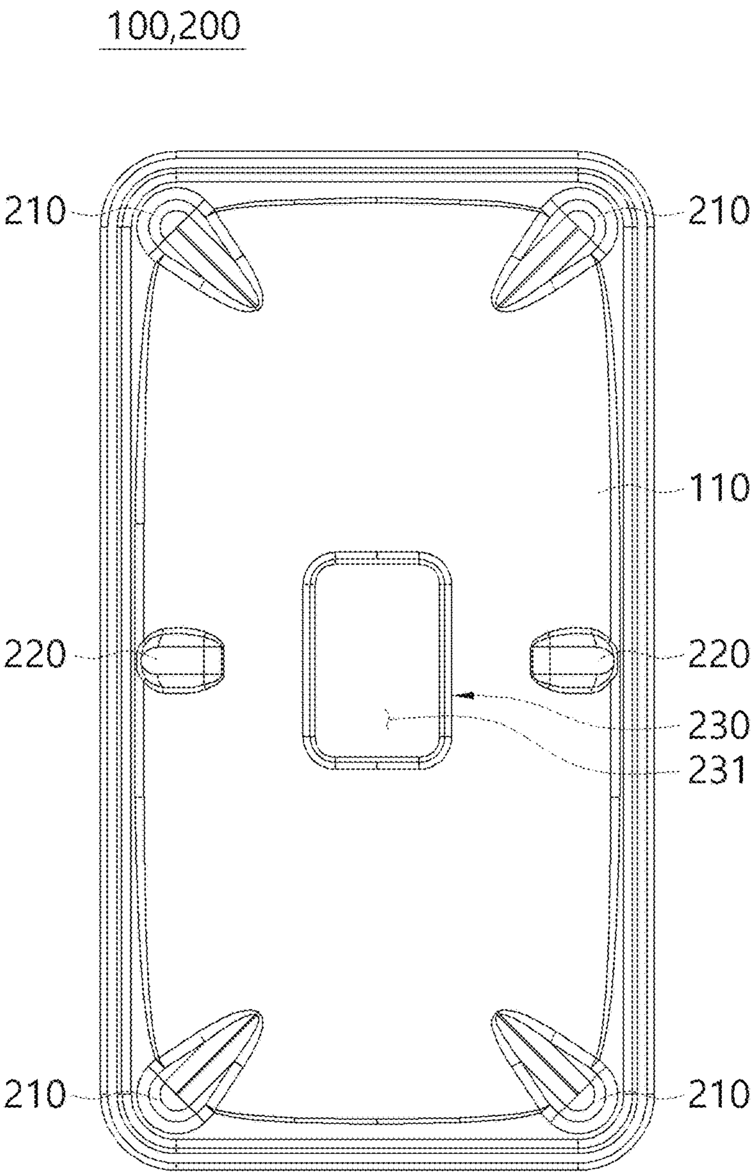
FIG. 4 is a plan view illustrating the tank cover and the tank cover reinforcing part of FIG. 3.
Figure 5:
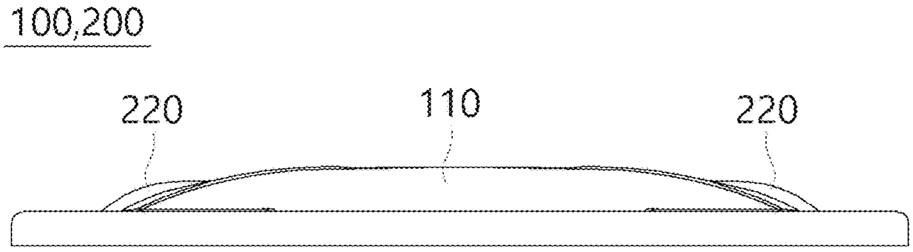
FIG. 5 is a front view illustrating the tank cover and the tank cover reinforcing part of FIG. 3.
Figure 6:
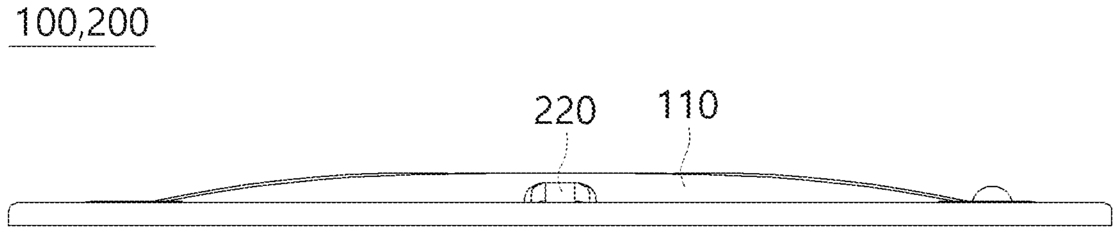
FIG. 6 is a side view illustrating the tank cover and the tank cover reinforcing part of FIG. 3.
Figure 7:
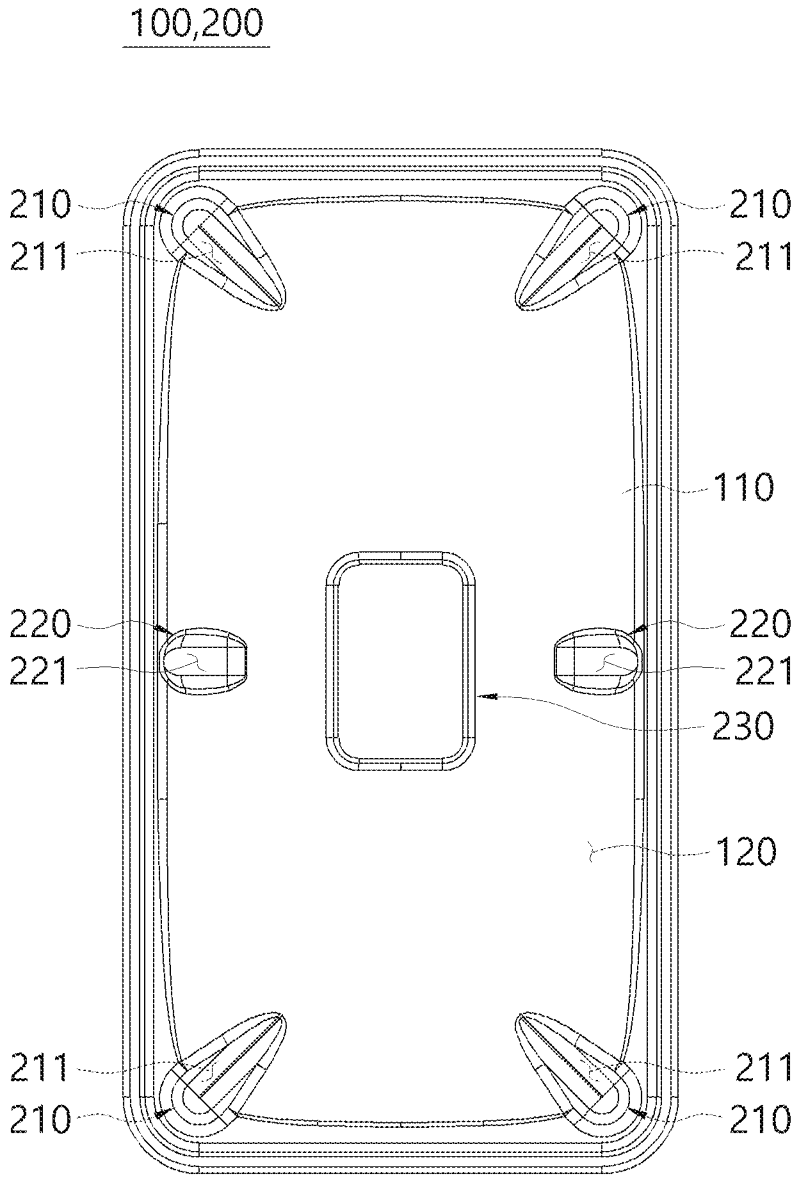
FIG. 7 is a bottom view illustrating the tank cover and the tank cover reinforcing part of FIG. 3.
Figure 8:
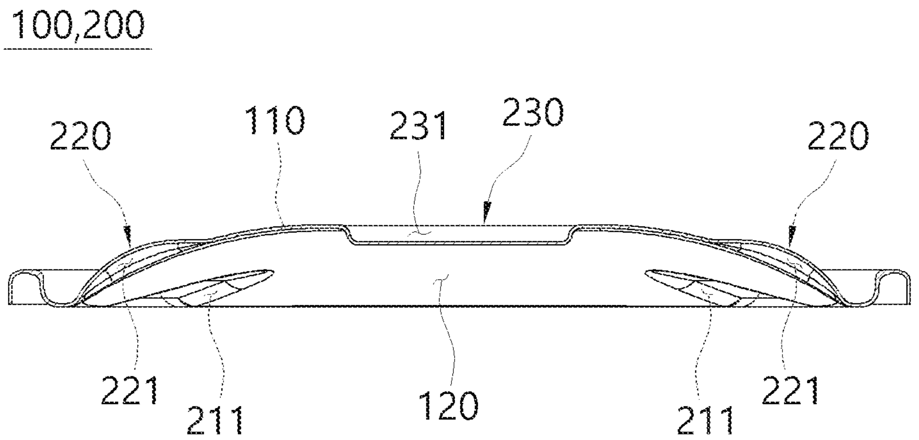
FIG. 8 is a C-C cross-sectional view illustrating the tank cover and the tank cover reinforcing part of FIG. 3.
Figure 9:
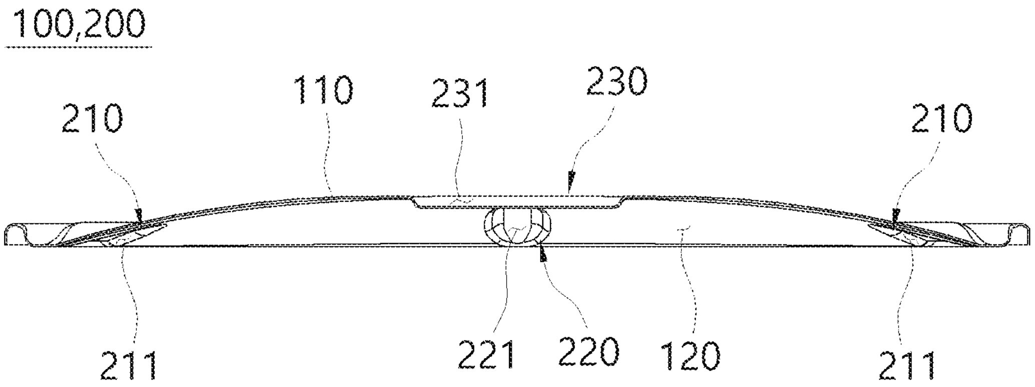
FIG. 9 is a D-D cross-sectional view illustrating the tank cover and the tank cover reinforcing part of FIG. 3.
Figure 10:
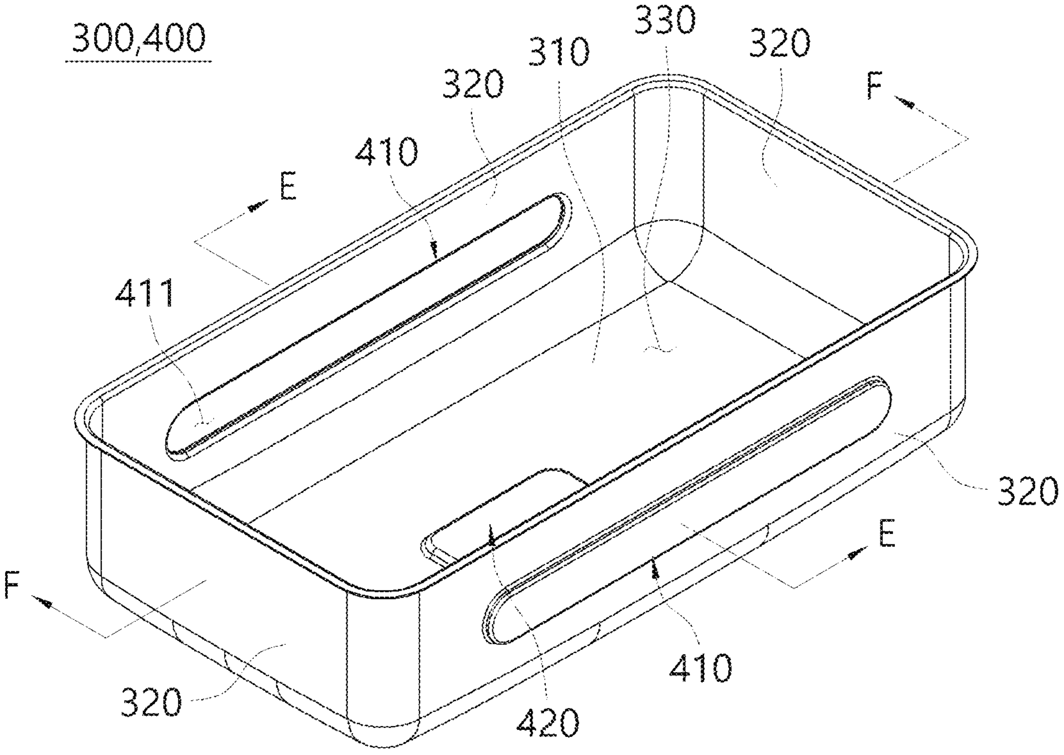
FIG. 10 is a perspective view illustrating a tank body and a tank body reinforcing part provided in the water tank of FIG. 1.
Figure 11:
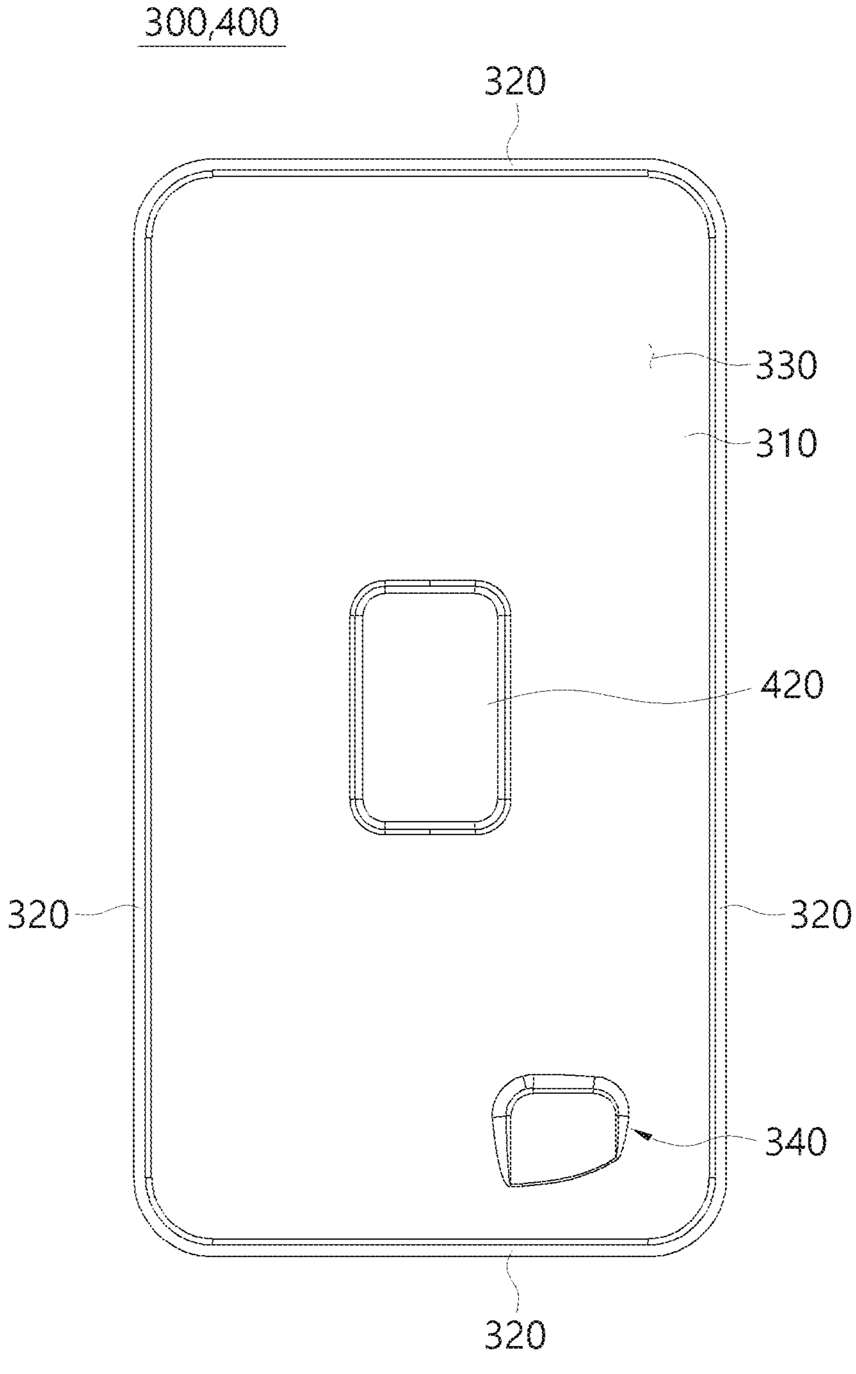
FIG. 11 is a plan view illustrating the tank body and the tank body reinforcing part of FIG. 10.
Figure 12:
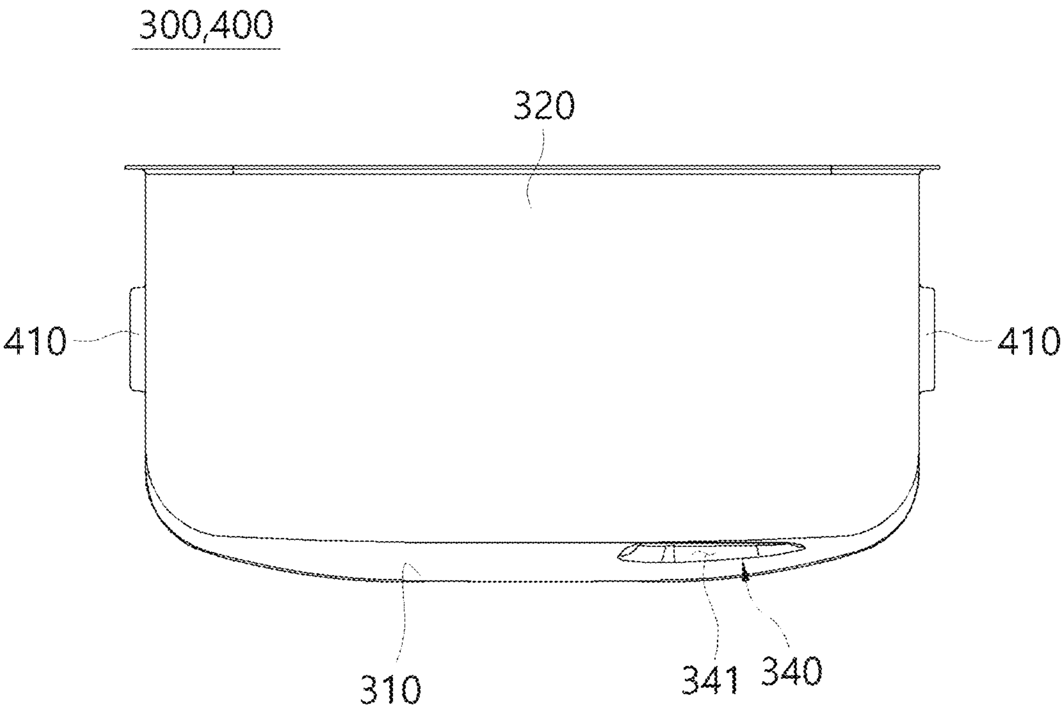
FIG. 12 is a front view illustrating the tank body and the tank body reinforcing part of FIG. 10.
Figure 13:
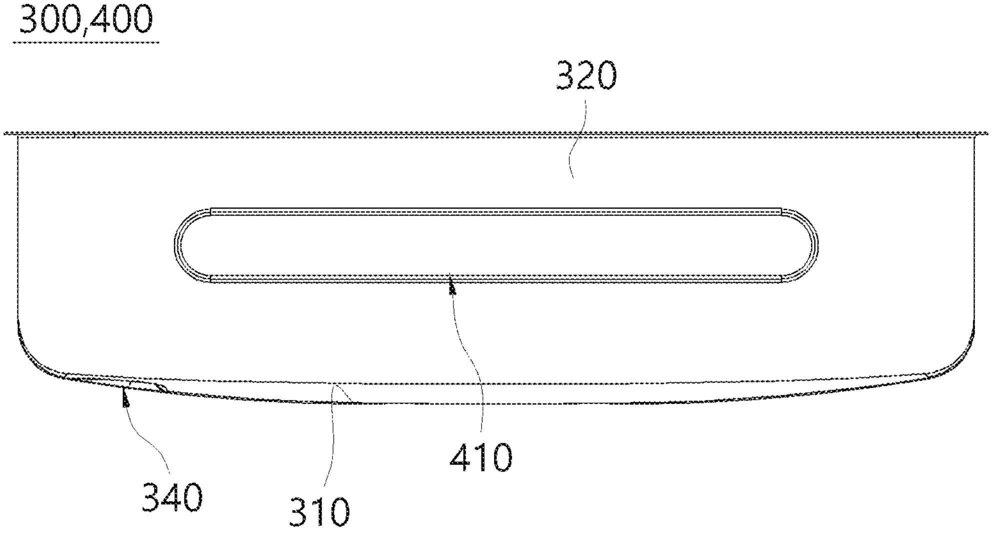
FIG. 13 is a side view illustrating the tank body and the tank body reinforcing part of FIG. 10.
Figure 14:
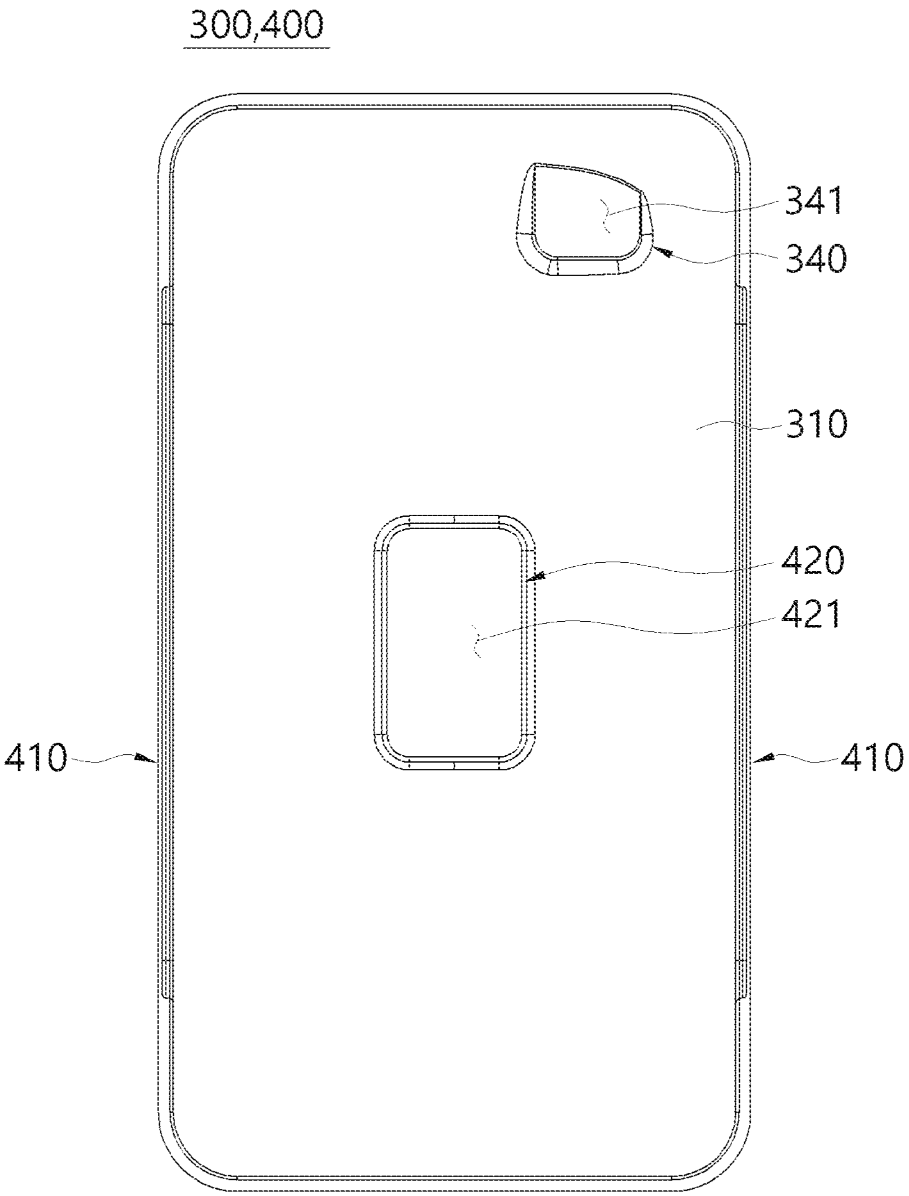
FIG. 14 is a bottom view illustrating the tank body and the tank body reinforcing part of FIG. 10.
Figure 15:
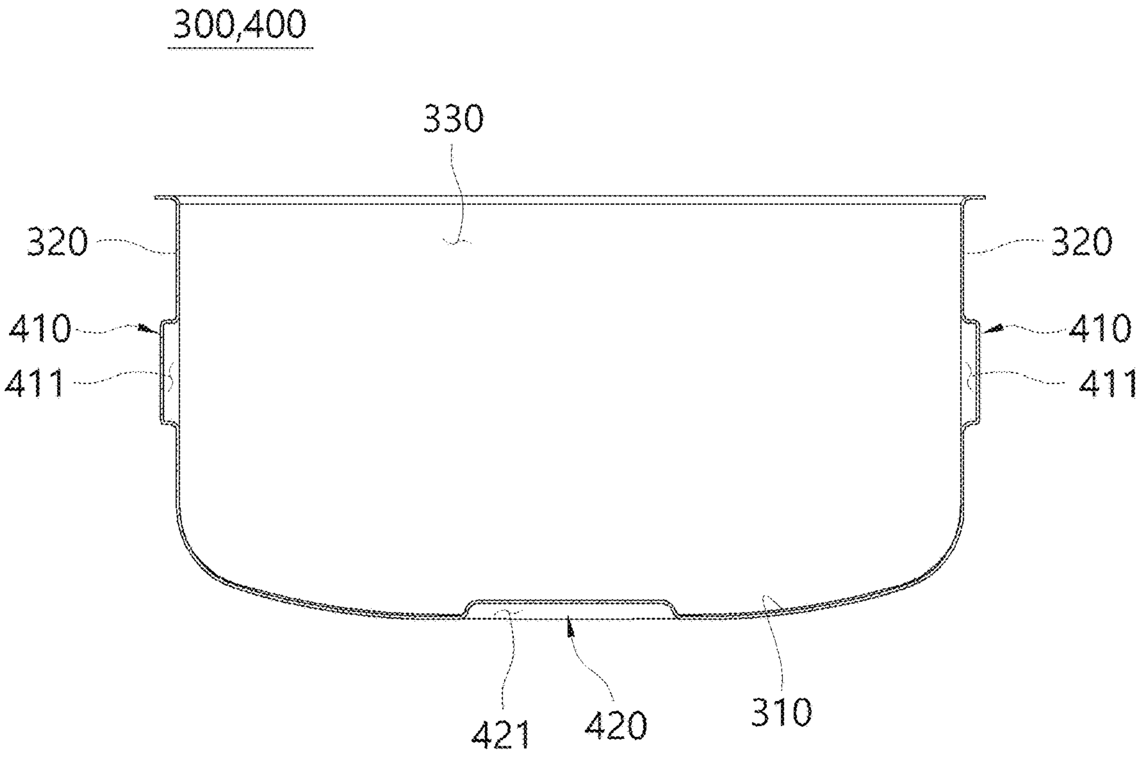
FIG. 15 is an E-E cross-sectional view illustrating the tank body and the tank body reinforcing part of FIG. 10.
Figure 16:
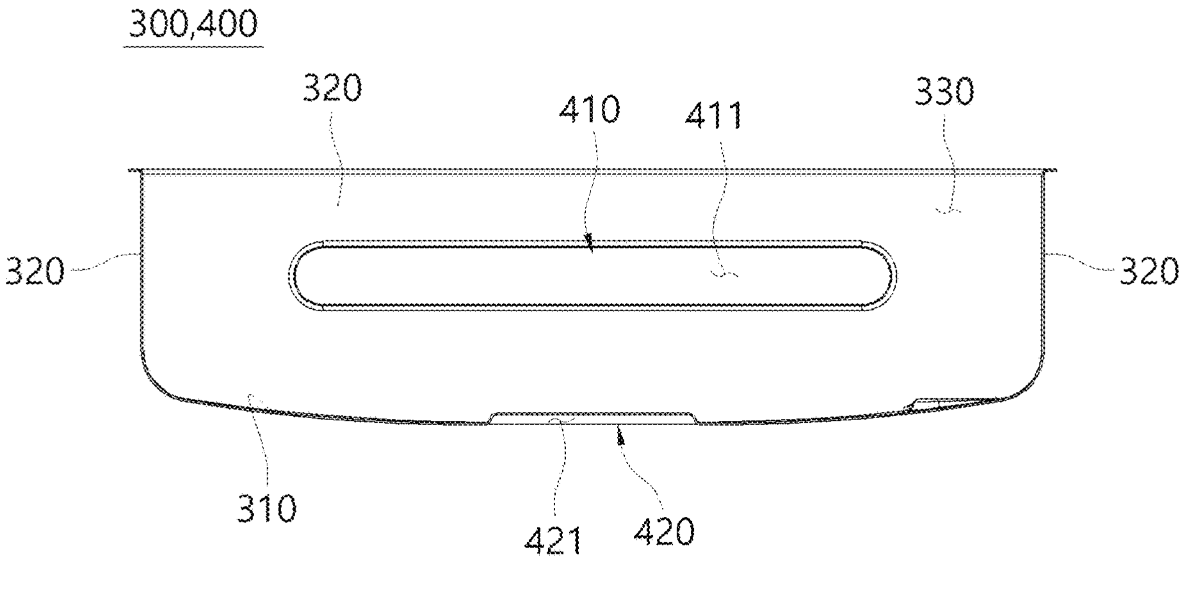
FIG. 16 is an F-F cross-sectional view illustrating the tank body and the tank body reinforcing part of FIG. 10.

Referring to FIGS. 1 and 2, a water tank 10 according to an embodiment of the present disclosure is illustrated. The water tank 10 according to an embodiment of the present disclosure is fluidically connected to the outside and may receive and store any fluid. For example, the water tank 10 may receive and store purified water produced by filtering raw water or cold or hot water produced by cooling or heating purified water.

The water tank 10 may be formed of a high-strength material. In addition, the water tank 10 may be formed of a material that does not rust due to a reaction with a fluid. In one embodiment, the water tank 10 may be formed of a stainless-steel material.

A space may be formed inside the water tank 10. The space may accommodate a fluid provided from the outside. In this case, the water tank 10 may be configured such that the space is sealed except for a passage for receiving a fluid from the outside or providing a fluid to the outside.

Therefore, when a fluid flows into or out of the space of the water tank 10, the pressure of the space may change. This pressure change may affect the outer shape of the water tank 10 surrounding the space. For example, the outer shape of the water tank 10 may expand or contract due to a pressure change.

If the above process is repeated, the water tank 10 may be subject to stress fatigue. In addition, even if the water tank 10 is not destroyed, the volume of the space may be deformed, and the amount of a fluid provided to the outside from the water tank 10 may vary. Furthermore, as the amount of a fluid provided to the outside after being heated or cooled in the water tank 10 changes, the temperature of the fluid provided to the user may also be arbitrarily changed.

In order to prevent this, the water tank 10 according to an embodiment of the present disclosure is configured to improve the pressure resistance of its own structure by changing the external structure. Furthermore, the water tank 10 according to an embodiment of the present disclosure is configured to include additional configurations (i.e., the tank cover reinforcing part 200 and the tank body reinforcing part 400 to be described below) for reinforcing the rigidity according to the external structure change. A detailed description thereof will be described below.

The water tank 10 according to an embodiment of the present disclosure may be provided in any device requiring the storage and provision of a fluid. In one embodiment, the water tank 10 may be provided and utilized in a water purifier. In another embodiment, the water tank 10 may be provided and utilized in a water softener or the like.

Meanwhile, the water tank 10 may be formed in a polygonal prism shape. In the illustrated embodiment, the water tank 10 has a three-dimensional shape with a square cross-section and a height in the vertical direction. As the water tank 10 is formed in the shape as described above, the volume of the space occupied by the water tank 10 may be minimized. As a result, interference with other components of the device in which the water tank 10 is provided may be minimized, and the degree of freedom in the arrangement of the water tank 10 may be improved.

In the illustrated embodiment, the water tank 10 includes a tank cover 100, a tank cover reinforcing part 200, a tank body 300 and a tank body reinforcing part 400.

The tank cover 100 constitutes a part of the outer shape of the water tank 10. The tank cover 100 is coupled to the tank body 300 to seal the tank body space 330 formed inside the tank body 300.

The tank cover 100 may be formed of a material that is highly rigid but does not rust. In one embodiment, the tank cover 100 may be formed of a stainless-steel material.

The tank cover 100 may be formed to have a shorter height than the tank body 300. In one embodiment, the tank cover 100 may be formed in a plate shape formed by sheet metal processing.

In this case, the tank cover 100 may be formed to have a rounded surface that is convex toward the outside, that is, in a direction opposite to the tank body 300. Accordingly, the tank cover 100 may be formed to have high pressure resistance for the fluid contained inside the water tank 10.

A tank cover reinforcing part 200 is formed on the tank cover 100. The tank cover reinforcing part 200 is configured to reinforce the rigidity of the tank cover 100 formed in a plate shape. A plurality of tank cover reinforcing parts 200 may be formed and positioned respectively at each part of the tank cover 100.

The tank cover 100 is coupled to the tank body 300. The tank cover 100 covers the tank body space 330 formed inside the tank body 300 and is coupled to the tank body 300.

In the embodiments shown in FIGS. 3 to 9, the tank cover 100 includes a tank cover surface 110 and a tank cover space 120.

The tank cover surface 110 constitutes the outer shape of the tank cover 100. The tank cover surface 110 is formed in a shape corresponding to the shape of the tank body 300 or the tank body space 330, and covers the tank body space 330 and is coupled to the tank body 300.

In the illustrated embodiment, the tank cover surface 110 is formed in a polygonal plate shape in which the length in the front-back direction is longer than the width in the left-right direction and the thickness in the up-down direction is greater. In this case, each side of the tank cover surface 110 in the longitudinal direction and the width direction may be formed by bending.

The tank cover surface 110 may be formed in a curved shape. The tank cover surface 110 may be formed to be rounded so as to be convex in a direction opposite to the tank body 300, that is, upward in the illustrated embodiment. Accordingly, each corner of the tank cover surface 110 in the longitudinal direction and the width direction may be positioned to be lower than a central portion of the tank cover surface 110.

As the tank cover surface 110 is formed in a curved shape, the pressure generated by the fluid flowing into or out of the tank body space 330 may be distributed along the curved tank cover surface 110. Accordingly, the concentration of pressure at a specific location may be alleviated, thereby preventing damage to the tank cover surface 110 due to the inflow or outflow of a fluid.

The tank cover surface 110 surrounds the tank cover space 120. In the illustrated embodiment, the tank cover surface 110 surrounds the tank cover space 120 on one side in the height direction, that is, the upper side. The tank cover surface 110 is arranged to face the tank body 300 with the tank cover space 120 therebetween.

A tank cover reinforcing part 200 is formed on the tank cover surface 110. As described above, the tank cover reinforcing part 200 is configured to reinforce the rigidity of the tank cover surface 110 which is a curved shape. Accordingly, even when the tank cover surface 110 is formed in a curved plate shape, the tank cover surface 110 may be formed to have sufficient rigidity.

The tank cover space 120 is a space formed inside the tank cover 100. The tank cover space 120 may be defined as a space formed by forming the tank cover surface 110 to be rounded so as to be convex toward the outside.

The tank cover space 120 is partially surrounded by the tank cover surface 110. In the illustrated embodiment, one side in the height direction of the tank cover space 120, that is, the upper side, is surrounded by the tank cover surface 110. Each side in the longitudinal direction and width direction of the tank cover space 120, that is, the front side, the back side, the left side and the right side, is surrounded by the corner of the tank cover surface 110. The other side in the height direction of the tank cover space 120, that is, the lower side in the illustrated embodiment, is formed to be open and fluidly communicates with the tank body space 330.

The tank cover space 120 may have a shape corresponding to the shape of the tank cover surface 110. In the illustrated embodiment, the tank cover space 120 is formed as a space in the shape of a shield shape, in which the length in the front-back direction is longer than the width in the left-right direction, and the height in the up-down direction is longer, but the cross-sectional area decreases as it goes upward.

The tank cover space 120 is connected to tank cover reinforcing spaces 211, 221 formed in the tank cover reinforcing part 200. In addition, a third tank cover reinforcing part 230 is positioned in the tank cover space 120.

The tank cover reinforcing part 200 is configured to reinforce the rigidity of the tank cover 100, and specifically, the tank cover surface 110 formed in a curved shape. Some components of the tank cover reinforcing part 200 are formed in the tank cover surface 110. Other components of the tank cover reinforcing part 200 may be positioned in the tank cover space 120 and connected thereto.

The tank cover reinforcing part 200 may be formed as a raised or sunken part on the surface of the tank cover face 110. The tank cover reinforcing part 200 may be continuous with the tank cover face 110. A plurality of tank cover reinforcing parts 200 may be provided, and may be respectively arranged at different locations on the tank cover face 110. In this case, the tank cover reinforcing part 200 may be arranged at a part of the tank cover face 110 that has the weakest rigidity.

In the embodiments illustrated in FIGS. 3 to 9, the tank cover reinforcing part 200 includes a first tank cover reinforcing part 210, a second tank cover reinforcing part 220 and a third tank cover reinforcing part 230.

The first tank cover reinforcing part 210 is arranged on one side of the tank cover face 110 and is configured to reinforce the rigidity of the tank cover face 110. The first tank cover reinforcing part 210 is continuous with the tank cover surface 110. The first tank cover reinforcement 210 may be formed such that a part of the tank cover surface 110 is raised in a direction opposite to the tank cover space 120, which is upward in the illustrated embodiment.

A plurality of first tank cover reinforcing parts 210 may be formed. The plurality of first tank cover reinforcing parts 210 may be formed at different locations on the tank cover surface 110. In the illustrated embodiment, a total of four first tank cover reinforcing parts 210 are formed. The four first tank cover reinforcing parts 210 are respectively arranged at each corner in the longitudinal direction and the width direction of the tank cover surface 110.

Specifically, any one pair of first tank cover reinforcing parts 210 are respectively arranged at the left and right corners of the back side of the tank cover surface 110. In addition, another pair of first tank cover reinforcing parts

210 are respectively arranged at the left and right corners of the front of the tank cover face 110.

That is, the plurality of first tank cover reinforcing parts 210 are positioned adjacent to each vertex of the tank cover face 110 formed in a polygonal plate shape.

The first tank cover reinforcing parts 210 may have any shape that can reinforce the rigidity of each corner of the tank cover face 110. In the illustrated embodiment, the first tank cover reinforcing part 210 may be divided into a plurality of parts.

A part positioned on the outer side of the plurality of parts is formed as a rounded three-dimensional shape that is convex in a direction toward the outer side of the tank cover face 110. A part positioned on the inner side of the plurality of parts is formed as a three-dimensional shape whose width decreases in a direction toward the center of the tank cover face 110.

In this case, all of the above-mentioned plurality of parts are formed to be raised so as to be convex toward one side, that is, the upper side, in the thickness direction of the tank cover surface 110.

In the illustrated embodiment, the first tank cover reinforcing part 210 includes the first tank cover reinforcing space 211.

The first tank cover reinforcing space 211 is a space formed inside the first tank cover reinforcing part 210. The first tank cover reinforcing space 211 may be formed as a part of the tank cover surface 110 is raised to form the first tank cover reinforcing part 210.

The first tank cover reinforcing space 211 may be positioned in a direction opposite to the direction in which the first tank cover reinforcing part 210 is raised. In the illustrated embodiment, the first tank cover reinforcing space 211 is positioned downward, which is opposite to the first tank cover reinforcing part 210 that is formed to be raised upward.

The first tank cover reinforcing space 211 is defined by being at least partially surrounded by the first tank cover reinforcing part 210. In the illustrated embodiment, the first tank cover reinforcing space 211 is surrounded by the first tank cover reinforcing part 210 on one side in the height direction, that is, the upper side, and each side in the horizontal direction, that is, the front side, the back side, the left side and the right side.

The lower side of the first tank cover reinforcing space 211 is formed to be open. Through this, the first tank cover reinforcing space 211 may be fluidly connected to the tank cover space 120. Therefore, the first tank cover reinforcing space 211 may increase the volume of the tank cover space 120 to a certain extent. As a result, the amount of a fluid accommodated in the water tank 10 may also be slightly increased.

The first tank cover reinforcing space 211 may have a shape corresponding to the shape of the first tank cover reinforcing part 210. In the illustrated embodiment, the first tank cover reinforcing space 211 may be divided into a part positioned on the outside and a part positioned on the inside.

Among the parts of the first tank cover reinforcing space 211, the part positioned on the outside is formed as a space having a three-dimensional shape that is rounded so as to be convex toward the outside. Among the parts of the first tank cover reinforcing space 211, the part positioned on the inside is formed as a space having a three-dimensional shape whose width decreases in a direction toward the center of the tank cover surface 110. Each part constituting the first tank cover reinforcing space 211 is fluidly connected to each other.

The second tank cover reinforcing part 220 is arranged on the other side of the tank cover surface 110 and is configured to reinforce the rigidity of the tank cover surface 110. The second tank cover reinforcing part 220 is continuous with the tank cover surface 110. The second tank cover reinforcement 220 may be formed such that another part of the tank cover surface 110 is raised in a direction opposite to the tank cover space 120, which is upward in the illustrated embodiment.

The second tank cover reinforcing part 220 may be formed in plurality. The plurality of second tank cover reinforcing parts 220 may be formed at different locations on the tank cover surface 110, respectively. In the illustrated embodiment, the second tank cover reinforcing parts 220 are formed in total in two numbers. The two second tank cover reinforcing parts 220 are arranged at each corner in the width direction of the tank cover surface 110, respectively at the left and right corners in the illustrated embodiment.

Any one of the second tank cover reinforcing parts 220 may be arranged between a pair of first tank cover reinforcing parts 210 positioned on the left. In this case, the any one of the second tank cover reinforcing parts 220 may be arranged at a location where the distance to each of the pair of first tank cover reinforcing parts 210 is the same.

Another one of the second tank cover reinforcing parts 220 may be arranged between another pair of first tank cover reinforcing parts 210 positioned on the right. In this case, the other second tank cover reinforcing part 220 may be arranged at the same position with respect to each of the pair of second tank cover reinforcing parts 220.

That is, the any one second tank cover reinforcing part 220 and the other one second tank cover reinforcing part 220 may be positioned at a central portion in the longitudinal direction of the tank cover surface 110.

The any one second tank cover reinforcing part 220 and the other one second tank cover reinforcing part 220 may be arranged to face each other with the third tank cover reinforcing part 230 interposed therebetween. In the illustrated embodiment, the pair of second tank cover reinforcing parts 220 are arranged to face each other with the third tank cover reinforcing part 230 interposed therebetween in the width direction of the tank cover surface 110, that is, in the left-right direction.

The second tank cover reinforcing part 220 may have any shape that can reinforce the rigidity of the corner in the longitudinal direction of the tank cover surface 110. In the illustrated embodiment, the second tank cover reinforcing part 220 may be divided into a plurality of parts.

Among the plurality of parts, the part positioned on the outside is a three-dimensional shape that is rounded so as to be convex in a direction toward the outside in the width direction of the tank cover surface 110. Among the plurality of parts, the part positioned on the inside is a three-dimensional shape whose width decreases in a direction toward the inside in the width direction of the tank cover surface 110.

In this case, all of the plurality of parts are formed to be convexly raised toward one side of the thickness direction of the tank cover surface 110, that is, toward the upper side.

Although not illustrated, the second tank cover reinforcing part 220 may also be arranged at each corner of the width direction of the tank cover surface 110, that is, the front side corner and the back side corner. In the above embodiment, the rigidity of each corner in the longitudinal direction and the width direction of the tank cover surface 110 may be reinforced such that the rigidity of the entire tank cover surface 110 may be reinforced.

In the illustrated embodiment, the second tank cover reinforcing part 220 includes a second tank cover reinforcing space 221.

The second tank cover reinforcing space 221 is a space formed inside the second tank cover reinforcing part 220. The second tank cover reinforcing space 221 may be formed by another part of the tank cover surface 110 being raised to form the second tank cover reinforcing part 220.

The second tank cover reinforcing space 221 may be positioned in a direction opposite to the direction in which the second tank cover reinforcing part 220 is raised. In the illustrated embodiment, the second tank cover reinforcing space 221 is positioned downwardly, opposite to the second tank cover reinforcing part 220 being raised upwardly.

The second tank cover reinforcing space 221 is defined by being at least partially surrounded by the second tank cover reinforcing part 220. In the illustrated embodiment, the second tank cover reinforcing space 221 is surrounded by the second tank cover reinforcing part 220 on one side in the height direction, that is, the upper side, and each side in the horizontal direction, that is, the front side, the back side, the left side and the right side.

The lower side of the second tank cover reinforcing space 221 is formed to be open. Through this, the second tank cover reinforcing space 221 may be fluidly connected to the tank cover space 120. Therefore, the second tank cover reinforcing space 221 may increase the volume of the tank cover space 120 to a certain extent. As a result, the amount of fluid accommodated in the water tank 10 may also be slightly increased.

The second tank cover reinforcing space 221 may have a shape corresponding to the shape of the second tank cover reinforcing part 220. In the illustrated embodiment, the second tank cover reinforcing space 221 may be divided into a part positioned on the outside and a part positioned on the inside along the width direction of the tank cover surface 110, that is, the left-right direction.

Among the parts of the second tank cover reinforcing space 221, the part positioned on the outside is formed as a space in a three-dimensional shape that is rounded so as to be convex toward the outside. Among the parts of the second tank cover reinforcing space 221, the part positioned on the inside is formed as a space in a three-dimensional shape whose width decreases in the direction toward the center of the tank cover surface 110 or the third tank cover reinforcing part 230. Each part constituting the second tank cover reinforcing space 221 is connected to each other.

The third tank cover reinforcing part 230 is arranged on still another side of the tank cover surface 110 and is configured to reinforce the rigidity of the tank cover surface 110. The third tank cover reinforcing part 230 is continuous with the tank cover surface 110. The third tank cover reinforcing part 230 may be formed by recessing still another part of the tank cover surface 110 toward the tank cover space 120, which is downward in the illustrated embodiment.

The third tank cover reinforcing part 230 is formed inside the tank cover surface 110. That is, the third tank cover reinforcing part 230 is positioned on the inside of the corner in the longitudinal direction or the width direction of the tank cover surface 110. In the illustrated embodiment, the third tank cover reinforcing part 230 is positioned at the center portion of the tank cover surface 110.

The third tank cover reinforcing part 230 is positioned between a pair of first tank cover reinforcing parts 210 that are spaced apart in the diagonal direction of the tank cover surface 110. In this case, the third tank cover reinforcing part 230 may be spaced apart by the same distance from each of the pair of first tank cover reinforcing parts 210.

In addition, the third tank cover reinforcing part 230 is positioned between a pair of second tank cover reinforcing parts 220 that are spaced apart in the width direction of the tank cover surface 110. In this case, the third tank cover reinforcing part 230 may be spaced apart by the same distance from each of the pair of second tank cover reinforcing parts 220.

The third tank cover reinforcing part 230 may have any shape that can reinforce the rigidity of the inside of the tank cover surface 110. In the illustrated embodiment, the third tank cover reinforcing part 230 has a rectangular cross-section, but is formed with a tapered vertex and a height in the vertical direction.

Additionally, in the illustrated embodiment, the third tank cover reinforcing part 230 is formed by partially sinking the center of the tank cover surface 110. In other words, the third tank cover reinforcing part 230 is formed such that the center of the tank cover surface 110 is convex toward the tank cover space 120.

In the illustrated embodiment, the third tank cover reinforcing part 230 includes a third tank cover reinforcing space 231.

The third tank cover reinforcing space 231 is a space formed inside the third tank cover reinforcing part 230. The third tank cover reinforcing space 231 is positioned on one side of the height direction of the tank cover surface 110, that is, on the upper side in the illustrated embodiment. The third tank cover reinforcing space 231 may be formed as the one side of the tank cover surface 110, that is, the upper side, is sunken to form the third tank cover reinforcing part 230.

The third tank cover reinforcing space 231 may be positioned in a direction opposite to the direction in which the third tank cover reinforcing part 230 is sunken. In the illustrated embodiment, the third tank cover reinforcing space 231 is positioned on the upper side opposite to the third tank cover reinforcing part 230 that is formed to be raised downward.

The third tank cover reinforcing space 231 is defined by being at least partially surrounded by the third tank cover reinforcing part 230. In the illustrated embodiment, the third tank cover reinforcing space 231 is surrounded by the third tank cover reinforcing part 230 on one side in the height direction, that is, the lower side, and each side in the horizontal direction, that is, the front side, the back side, the left side and the right side.

The upper side of the third tank cover reinforcing space 231 is formed as an open shape. Through this, the third tank cover reinforcing space 231 may be connected to the outside.

The third tank cover reinforcing space 231 may have a shape corresponding to the shape of the third tank cover reinforcing part 230. In the illustrated embodiment, the third tank cover reinforcing space 231 is formed as a three-dimensional space having a rectangular cross section and a thickness of the tank cover surface 110, that is, a height in the up-down direction.

As the first to third tank cover reinforcing parts 210, 220, 230 are formed, the surface of the tank cover surface 110, that is, the surface surrounding the tank cover space 120, is formed to be curved. In addition, as the first to third tank cover reinforcing parts 210, 220, 230 are formed, the rigidity of each part of the tank cover surface 110 where stress is concentrated and cracks are easily generated may be reinforced.

Therefore, damage to the tank cover 100 due to a difference in pressure generated when a fluid flows into or out of the water tank 10 may be prevented.

In addition, the first to third tank cover reinforcing parts 210, 220, 230 may be formed by the tank cover surface 110 being raised or sunken. Therefore, since no separate member is required to form the first to third tank cover reinforcing parts 210, 220, 230, the tank cover reinforcing part 200 may be easily manufactured, and the manufacturing cost may also be reduced.

The tank body 300 constitutes another part of the outer shape of the water tank 10. The tank body 300 is coupled to the tank cover 100. A space for accommodating a fluid is formed inside the tank body 300. The space (i.e., the tank space 330) of the tank body 300 may be sealed by the tank cover 100.

The tank body 300 may be formed of a material that has high strength but does not rust. In one embodiment, the tank body 300 can be formed of a stainless-steel material.

The tank body 300 may be formed to have a longer height than the tank cover 100. In one embodiment, the tank body 300 may be formed as a three-dimensional shape having a predetermined height by sheet metal processing. In this case, the tank body 300 may be formed to have a rectangular cross-section.

Accordingly, the water tank 10 formed by combining the tank body 300 and the tank cover 100 may also have a rectangular cross-section and may be formed as a polygonal prism shape having a height in the vertical direction. Accordingly, the size of the space occupied by the water tank 10 may not be excessively increased, thereby improving the degree of freedom in arrangement.

In this case, the tank body 300 may be formed to have a rounded surface so as to be convex toward the outside, that is, in a direction opposite to the tank cover 100. In the illustrated embodiment, one side of the surface of the tank body 300 opposite to the tank cover 100, that is, the lower surface, is formed to be rounded so as to be convex toward the outside.

Accordingly, the tank body 300 may also be formed to have high pressure resistance for the fluid contained inside the water tank 10.

The tank body 300 is coupled to the tank cover 100. As described above, the tank body space 330 formed inside the tank body 300 and the tank cover space 120 formed inside the tank cover 100 are connected to each other, but may be sealed by the tank cover 100.

A tank body reinforcing part 400 is formed in the tank body 300. The tank body 300 is configured to reinforce the rigidity of the tank body 300 composed of molded parts. A plurality of tank body reinforcing parts 400 may be formed and positioned at each part of the tank body 300.

In the embodiments illustrated in FIGS. 10 to 16, the tank body 300 includes a tank body bottom surface 310, a tank body side surface 310, a tank body space 330, and a pipe joint part 340.

The tank body bottom surface 310 constitutes a part of the outer shape of the tank body 300. In the illustrated embodiment, the tank body bottom surface 310 constitutes one side in the height direction of the tank body 300, that is, the lower side.

The tank body bottom surface 310 is formed in a shape corresponding to the shape of the horizontal cross-section of the tank cover 100 or the tank body 300. In the illustrated embodiment, the tank body bottom surface 310 has a rectangular cross-section whose length in the front-back direction is longer than its width in the left-right direction, and is formed in a polygonal plate shape having a thickness in the up-down direction. Each side in the longitudinal direction and each side in the width direction of the tank body bottom surface 310 may be bent to be continuous with the tank body side surface 310.

The tank body bottom surface 310 may be formed in a curved shape. The tank body bottom surface 310 may be formed to be rounded so as to be convex in a direction opposite to the tank cover 100 or the tank body space 330, that is, downward in the illustrated embodiment. Accordingly, each corner in the longitudinal direction and the width direction of the tank body bottom surface 310 may be positioned higher than the central part of the tank body bottom surface 310.

As the tank body bottom surface 310 is formed in a curved shape, the pressure generated by the fluid flowing into or out of the tank body space 330 may be distributed along the curved tank body bottom surface 310. Accordingly, the pressure distribution at a specific location may be alleviated, thereby preventing damage to the tank body bottom surface 310 due to the inflow or outflow of a fluid.

The tank body bottom surface 310 is continuous with the tank body side surface 310. In the illustrated embodiment, each corner of the longitudinal direction and each corner of the width direction of the tank body bottom surface 310 is continuous with the tank body side surface 310 at a predetermined angle. In one embodiment, the predetermined angle may be a right angle.

The tank body bottom surface 310 partially surrounds the tank body space 330. The tank body bottom surface 310 may surround the tank body space 330 on one side in the height direction. In the illustrated embodiment, the tank body bottom surface 310 surrounds the tank body space 330 on the lower side. When the tank body 300 is coupled to the tank cover 100, the tank body bottom surface 310 may face the tank cover surface 110 with the tank body space 330 therebetween.

A pipe joint part 340 is formed on the tank body bottom surface 310. A part of the tank body bottom surface 310 may be formed sunken, thereby defining the pipe joint part 340.

A second tank body reinforcing part 420 of the tank body reinforcing part 400 is positioned on the tank body bottom surface 310. Another part of the tank body bottom surface 310 may also be formed sunken, thereby defining the second tank body reinforcing part 420.

The tank body side surface 310 forms another part of the outer shape of the tank body 300. In the illustrated embodiment, the tank body side surface 310 constitutes each side of the tank body 300 in the horizontal direction, that is, the front side, the back side, the left side and the right side.

The tank body side surface 310 is continuous with the tank body bottom surface 310. In the illustrated embodiment, the tank body side surface 310 is continuous with each corner of the tank body bottom surface 310 at a predetermined angle.

The tank body side surface 310 may have a shape corresponding to the shape of each corner of the tank body bottom surface 310. In addition, the tank body side surface 310 may be divided into a plurality of parts.

In the illustrated embodiment, the tank body side surface 310 is configured to include a pair of parts that are continuous with each corner of the tank body bottom surface 310 in the width direction and another pair of parts that are continuous with each corner of the tank body bottom surface 310 in the longitudinal direction.

The pair of parts surround the tank body space 330 on each side in the width direction, a left side and a right side in the illustrated embodiment. The pair of parts are formed in a plate shape having a length in the longitudinal direction of the tank body bottom surface 310, that is, a length in the front-back direction, longer than the height in the vertical direction, and a thickness in the left-right direction. The pair of parts are arranged to face each other with the tank body space 330 interposed along the thickness direction, that is, the left-right direction.

The other pair of parts surround the tank body space 330 on each side in the longitudinal direction, that is, the front-back direction. The other pair of parts are formed in a plate shape having a length in the width direction of the tank body bottom surface 310, that is, a length in the left-right direction, longer than the height in the vertical direction, and a thickness in the front-back direction. The other pair of parts are arranged to face each other with the tank body space 330 interposed along the thickness direction, that is, the front-back direction.

A first tank body reinforcing part 410 may be formed on a part of the tank body side surface 310. In the illustrated embodiment, the first tank body reinforcing part 410 is formed on a pair of parts arranged on each side of the width direction of the tank body bottom surface 310.

The tank body space 330 is a space formed inside the tank body 300. The tank body space 330 is defined by being surrounded by the tank body bottom surface 310 and the tank body side surface 310.

The tank body space 330 is partially surrounded by the tank body bottom surface 310. In the illustrated embodiment, one side in the height direction of the tank body space 330, that is, the lower side, is surrounded by the tank body bottom surface 310. The other side in the height direction of the tank body space 330, that is, the upper side in the illustrated embodiment, is formed to be open and communicates with the tank cover space 120.

The tank body space 330 is partially surrounded by the tank body side surface 310. In the illustrated embodiment, each side in the longitudinal direction and width direction of the tank body space 330, that is, the front side, the back side, the left side and the right side, is surrounded by the tank body side surface 310.

The tank body space 330 may have a shape corresponding to the shape of the tank body bottom surface 310 and the tank body side surface 310. In the illustrated embodiment, the tank body space 330 is formed as a three-dimensional space having a length in the front-back direction longer than the width in the left-right direction, a height in the up-down direction, and a lower side convexly formed.

The tank body space 330 is fluidly connected to the tank body reinforcing spaces 411, 421 formed in the tank body reinforcing part 400. In addition, a pipe joint part 340 and a second tank body reinforcing part 420 are positioned in the tank body space 330.

The pipe joint part 340 is a part to which an arbitrary member, such as a pipe, is combined for fluidly connecting the tank body space 330 to the outside. The pipe joint part 340 is formed in the tank body 300 and may be coupled to a pipe (not illustrated). In one embodiment, a pipe (not illustrated) may be welded to the pipe joint part 340.

The pipe joint part 340 is positioned in a part of the tank body 300 surrounding the tank body space 330. In the illustrated embodiment, the pipe joint part 340 is formed on the tank body bottom surface 310 constituting the lower side of the tank body 300.

The pipe joint part 340 may be formed in any shape that can be coupled to a pipe (not illustrated) to fluidly connect the tank body space 330 to the outside. In the illustrated embodiment, the pipe joint part 340 is formed by recessing into the tank body bottom surface 310. The pipe joint part 340 is a three-dimensional shape having a polygonal cross-section and a height in the vertical direction.

The pipe joint part 340 is positioned on one side of the tank body bottom surface 310 in the longitudinal direction, that is, the front side in the illustrated embodiment. A part of the pipe joint part 340, which is the upper side in the illustrated embodiment, is positioned in the tank body space 330. The location of the pipe joint part 340 may be arranged at any position where the tank body 300 can be coupled with a pipe (not illustrated).

As the pipe joint part 340 is formed by being sunken, the pipe joint part 340 may also play a role in reinforcing the rigidity of the tank body bottom surface 310. Therefore, the rigidity of the tank body 300 may be further reinforced compared to a case where only the tank body reinforcing part 400 is formed.

In the illustrated embodiment, the pipe joint part 340 includes a pipe space 341.

The pipe space 341 is a space formed inside the pipe joint part 340 that is sunken into the tank body bottom surface 310. The pipe space 341 is defined by being at least partially surrounded by the pipe joint part 340.

In the illustrated embodiment, one side in the height direction of the pipe space 341, that is, the upper side, and each side in the longitudinal direction and width direction, that is, the front side, the back side, the left side and the right side, are defined by being surrounded by the pipe joint part 340. The other side in the height direction of the pipe space 341, that is, the lower side, is open and communicates with the outside.

In the pipe space 341, a pipe (not illustrated) and any member for connecting the same to the tank body 300, such as a base metal, may be positioned.

The tank body reinforcing member 400 is configured to reinforce the rigidity of the tank body 300. Some components of the tank body reinforcing member 400 may be formed on the tank body bottom surface 310 to reinforce the rigidity of the tank body bottom surface 310. In addition, other components of the tank body reinforcing member 400 may be formed on the tank body side surface 310 to reinforce the rigidity of the tank body side surface 310.

In this case, a space communicating with the tank body space 330 may be formed inside each component of the tank body reinforcing part 400.

The tank body reinforcing part 400 may be formed as a raised or sunken part on each surface 310, 320 of the tank body 300. The tank body reinforcing part 400 may be continuous with each surface 310, 320 of the tank body 300, respectively. A plurality of tank body reinforcing parts 400 may be provided, and may be respectively arranged at different locations of the tank body 300. In this case, the tank body reinforcing part 400 may be arranged at a location that is most suitable for reinforcing the rigidity of the surfaces 310, 320 of the tank body 300.

In the embodiments illustrated in FIGS. 10 to 16, the tank body reinforcing part 400 includes a first tank body reinforcing part 410 and a second tank body reinforcing part 420.

The first tank body reinforcing part 410 is arranged on the tank body side surface 310 and is configured to reinforce the rigidity of the tank body side surface 310. The first tank body reinforcing part 410 is continuous with the tank body side surface 310. The first tank body reinforcing part 410 may be formed such that a part of the tank body side surface 310 protrudes in a direction opposite to the tank body space 330, that is, toward the outside.

A plurality of first tank body reinforcing parts 410 may be formed. A plurality of first tank body reinforcing parts 410 may be formed at different locations on the tank body side surface 310. In the illustrated embodiment, a pair of first tank body reinforcing parts 410 are provided.

A pair of first tank body reinforcing parts 410 are respectively formed on the pair of parts of the tank body side surface 310 that are spaced apart from each other in the width direction of the tank body 300, that is, in the left-right direction. A pair of first tank body reinforcing parts 410 are arranged to face each other with a tank body space 330 therebetween. In this case, the first tank body reinforcing part 410 may be formed to protrude outwardly of the pair of parts of the tank body side surface 310.

In the above embodiment, the first tank body reinforcing part 410 may have a length in the front-back direction longer than a height in the up-down direction, and may be formed to protrude outwardly along the left-right direction. In this case, the length in the front-back direction of the first tank body reinforcing part 410 may be shorter than the length in the front-back direction of the pair of parts of the tank body side surface 310. In addition, the height in the up-down direction of the first tank body reinforcing part 410 may be shorter than the height in the up-down direction of the pair of parts of the tank body side surface 310.

Therefore, it will be understood that the first tank body reinforcing part 410 is formed in a three-dimensional shape having an oblong cross-section and a thickness in the left-right direction.

Although not illustrated, the first tank body reinforcing part 410 may be further formed in the other pair of parts of the tank body side surface 310. In the above embodiment, the first tank body reinforcing part 410 may have a length in the left-right direction longer than the height in the up-down direction and may be formed to protrude outwardly along the front-back direction.

In the illustrated embodiment, the first tank body reinforcing part 410 includes a first tank body reinforcing space 411.

The first tank body reinforcing space 411 is a space formed inside the first tank body reinforcing part 410. The first tank body reinforcing space 411 may be formed by a part of the tank body side surface 310 being raised to form the first tank body reinforcing part 410.

The first tank body reinforcing space 411 may be positioned in a direction opposite to the direction in which the first tank body reinforcing part 410 is raised. In the illustrated embodiment, the first tank body reinforcing space 411 is positioned inwardly, opposite to the first tank body reinforcing part 410 being raised outwardly.

Specifically, the first tank body reinforcing space 411 of the first tank body reinforcing part 410 positioned on the left side is positioned on the right side, and the first tank body reinforcing space 411 of the first tank body reinforcing part 410 positioned on the right side is positioned on the left side.

The first tank body reinforcing space 411 is defined by being at least partially surrounded by the first tank body reinforcing part 410. In the illustrated embodiment, the first tank body reinforcing space 411 is surrounded by the first tank body reinforcing part 410 on the outer side in the thickness direction, that is, any one of the left and right sides, and on each side in the height direction and the longitudinal direction, that is, the front side, the back side, the upper side and the lower side.

The other one of the inner sides in the thickness direction of the first tank body reinforcing space 411, that is, the left and the right side, is formed to be open. Through this, the first tank body reinforcing space 411 may be communicated with the tank body space 330. Therefore, the first tank body reinforcing space 411 may increase the volume of the tank body space 330 to a certain extent. As a result, the amount of a fluid accommodated in the water tank 10 may also be slightly increased.

The first tank body reinforcing space 411 may have a shape corresponding to the shape of the first tank body reinforcing part 410. In the illustrated embodiment, the first tank body reinforcing space 411 is formed as a three-dimensional space having a rectangular cross-section and a thickness in the left-right direction.

The second tank body reinforcing part 420 is arranged on the tank body bottom surface 310 and is configured to reinforce the rigidity of the tank body bottom surface 310. The second tank body reinforcing part 420 is continuous with the tank body bottom surface 310. The second tank body reinforcing part 420 may be formed by sinking a part of the tank body bottom surface 310 toward the tank body space 330, that is, toward the inside.

The second tank body reinforcing part 420 is formed on the inside of the tank body bottom surface 310. The second tank body reinforcing part 420 may be positioned apart from the pipe joint part 340. In the illustrated embodiment, the second tank body reinforcing part 420 is positioned adjacent to the center of the cross-section of the tank body bottom surface 310.

The second tank body reinforcing part 420 is at least partially positioned in the tank body space 330. In the illustrated embodiment, one side of the second tank body reinforcing part 420 in the height direction, that is, the upper side, is positioned in the tank body space 330.

The second tank body reinforcing part 420 may have any shape that can reinforce the rigidity of the tank body bottom surface 310. In the illustrated embodiment, the second tank body reinforcing part 420 has a rectangular cross-section and is a three-dimensional shape that is formed by sinking toward the tank body space 330 from the lower side of the tank body bottom surface 310.

Although not illustrated, the second tank body reinforcing part 420 may be formed in plurality. The plurality of second tank body reinforcing parts 420 are formed in different locations of the tank body bottom surface 310, and each may reinforce the rigidity of the tank body bottom surface 310.

Additionally, in another embodiment, the second tank body reinforcing part 420 may be formed to correspond to the shape of the first tank cover reinforcing part 210 described above. That is, in the above embodiment, the second tank body reinforcing part 420 may be formed to protrude downward from the lower surface of the tank body bottom surface 310.

In the illustrated embodiment, the second tank body reinforcing part 420 includes a second tank body reinforcing space 421.

The second tank body reinforcing space 421 is a space formed inside the second tank body reinforcing part 420. The second tank body reinforcing space 421 may be formed as a part of the tank body bottom surface 310 is sunken to form the second tank body reinforcing part 420.

The second tank body reinforcing space 421 may be positioned in a direction opposite to the direction in which the second tank body reinforcing part 420 is sunken. In the illustrated embodiment, the second tank body reinforcing space 421 is positioned on the lower side opposite to the second tank body reinforcing part 420 that is sunken upward.

The second tank body reinforcing space 421 is defined by being at least partially surrounded by the second tank body reinforcing part 420. In the illustrated embodiment, the second tank body reinforcing space 421 is surrounded by the second tank body reinforcing part 420 on one side in the thickness direction, that is, the upper side, and each side in the horizontal direction, that is, the front side, the back side, the upper side and the lower side.

The other side in the thickness direction of the second tank body reinforcing space 421, which is the lower side in the illustrated embodiment, is formed to be open. The second tank body reinforcing space 421 is connected to the outside through the other side.

The second tank body reinforcing space 421 may have a shape corresponding to the shape of the second tank body reinforcing part 420. In the illustrated embodiment, the second tank body reinforcing space 421 is formed as a three-dimensional space having a rectangular cross-section and a thickness in the vertical direction.

As the first and second tank body reinforcing parts 410, 420 are formed, the surface facing the tank body space 330 among the parts of the tank body bottom surface 310 and the tank body side surface 310 is formed to be curved. In addition, as the first and second tank body reinforcing parts 410, 420 are formed, the rigidity of each part of the tank body bottom surface 310 and the tank body side surface 310 where stress is concentrated and cracks easily occur may be reinforced. Therefore, damage to the tank cover 100 caused by the pressure difference that occurs when a fluid flows into or out of the water tank 10 may be prevented.

In addition, the first and second tank body reinforcing parts 410, 420 may be formed by protruding or sinking the tank body bottom surface 310 or the tank body side surface 310. Therefore, since a separate member is not required to form the first and second tank body reinforcing parts 410, 420, the tank body reinforcing part 400 may be easily manufactured, and the manufacturing cost may also be reduced.

Figure 17:
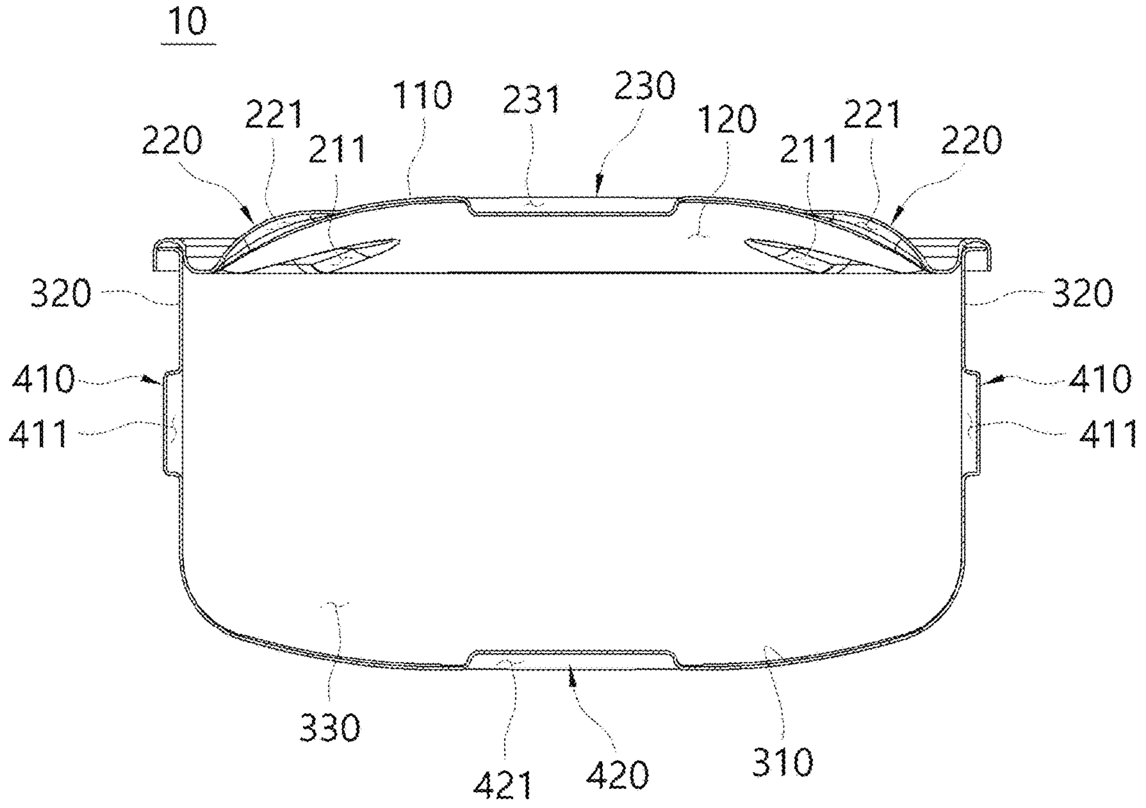
FIG. 17 is an A-A cross-sectional view illustrating the water tank of FIG. 1.
Figure 18:
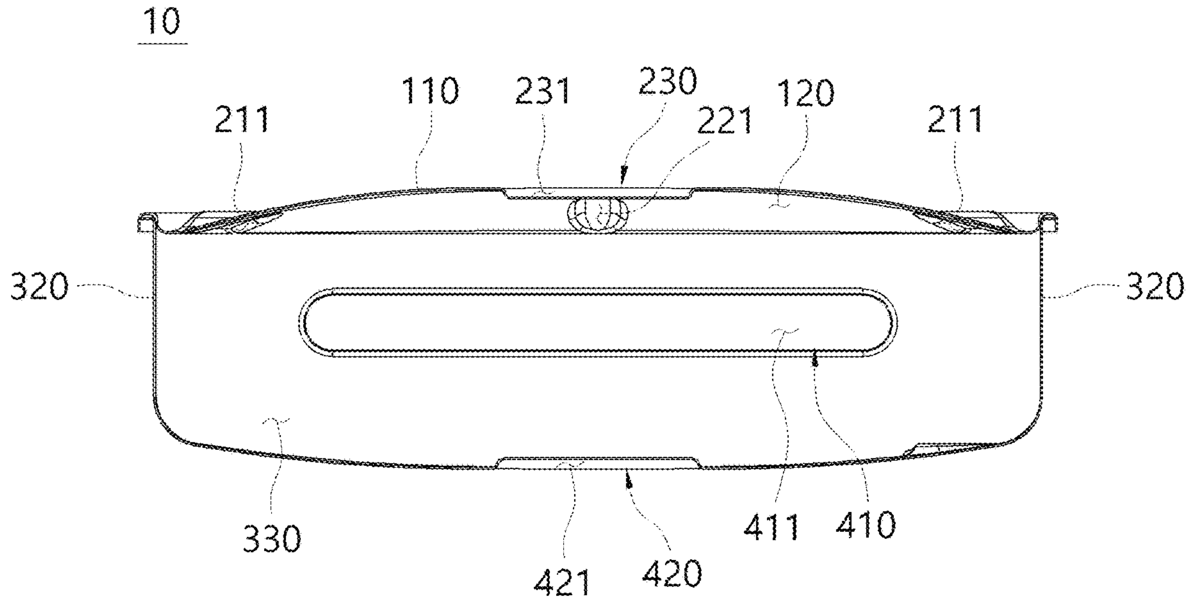
FIG. 18 is a B-B cross-sectional view illustrating the water tank of FIG. 1.

Referring to FIGS. 17 and 18, the internal structure of the water tank 10 according to an embodiment of the present disclosure is illustrated as an example. In the above embodiment, the tank cover 100 and the tank body 300 are coupled to each other such that the tank cover space 120 and the tank body space 330 are fluidly connected to each other.

In addition, the tank cover space 120 and the tank body space 330 are sealed by the tank cover surface 110, the tank body bottom surface 310 and the tank body side surface 310, respectively, such that any communication with the outside is blocked.

First of all, when examining the tank cover 100, the tank cover surface 110 is formed as a rounded surface that is convex upward in a direction opposite to the tank cover space 120, which is the upper side in the illustrated embodiment. Accordingly, the pressure applied to the tank cover surface 110 is distributed such that deformation or damage to the tank cover 100 due to the pressure of the fluid flowing inside the water tank 10 may be prevented.

In addition, first and second tank cover reinforcing parts 210, 220 are formed protruding on the outer side, that is, the upper side, of the tank cover surface 110, respectively, to reinforce the rigidity of the tank cover surface 110. In addition, a third tank cover reinforcing part 230 is formed by sinking on the outer side, that is, the upper side, of the tank cover surface 110 to reinforce the rigidity of the tank cover surface 110.

In this case, the first to third tank cover reinforcing parts 210, 220, 230 are spaced apart from each other such that the rigidity of the tank cover 100 may be reinforced at different locations.

In addition, when examining the tank body 300, the tank body bottom surface 310 is formed as a rounded surface that is convex downward in the direction opposite to the tank body space 330, which is the lower side in the illustrated embodiment. Accordingly, the pressure applied to the tank body bottom surface 310 is distributed such that deformation or damage to the tank body 300 due to the pressure of the fluid flowing inside the water tank 10 may be prevented.

In addition, a second tank body reinforcing part 420 is formed by sinking on the outer side, that is, the lower side, of the tank body bottom surface 310 to reinforce the rigidity of the tank body bottom surface 310. In addition, as described above, the pipe joint part 340 formed on the outer side, that is, the lower side, of the tank body bottom surface 310 may also reinforce the rigidity of the tank body bottom surface 310.

A first tank body reinforcing part 410 is formed by raising on the outer side, that is, the left or right side, of the tank body side surface 310 to reinforce the rigidity of the tank body side surface 310. In this case, a plurality of first tank body reinforcing parts 410 may be provided, and may be formed on each of the left and right sides of the tank body side surface 310 in the width direction of the tank body 300.

Therefore, the water tank 10 according to an embodiment of the present disclosure may disperse the pressure of a fluid flowing inside by changing the structure of the tank cover 100 and the tank body 300 itself. In addition, the rigidity of the tank cover 100 may be reinforced by the tank cover reinforcing part 200, and the rigidity of the tank body 300 may be reinforced by the tank body reinforcing part 400.

That is, without significantly changing the external shape of the water tank 10, the pressure resistance against the flowing fluid may be improved, and shape deformation or damage may be prevented.

According to the water tank 10 according to an embodiment of the present disclosure described above, the volume of the water tank 10 may be maintained regardless of the pressure change inside due to the fluid flowing in or out.

Therefore, the water tank 10 according to an embodiment of the present disclosure may enable the quantitative extraction and constant temperature extraction of a fluid.

Specifically, the flow rate of a fluid provided to the outside by the water purifier (not illustrated) may be adjusted in accordance with the time that the extraction valve (not illustrated) coupled with the water tank 10 is kept in an open state.

Similarly, the temperature of a fluid provided to the outside by the water purifier (not illustrated) may be adjusted in accordance with the amount of hot or cold water flowing out of the water tank 10 while the extraction valve (not illustrated) coupled with the water tank 10 is kept in an open state.

In this case, if the tank cover 100 or the tank body 300 constituting the water tank 10 contracts or expands while the extraction valve (not illustrated) is open, there is a concern that the fluid may be extracted in excess or insufficiently in proportion to the contracted or expanded volume.

In order to prevent this, as described above, the water tank 10 according to an embodiment of the present disclosure may prevent deformation of the shape of the water tank 10 while the fluid flows into or out of the water tank 10. Accordingly, the amount of a fluid flowing out while the above extraction valve (not illustrated) is open may be adjusted to a constant level.

As a result, the fluid provided to the outside may be provided in a constant amount and at a constant temperature at the same time.

Although the embodiments of the present disclosure have been described, the spirit of the present disclosure is not limited to the embodiments presented in the present specification, and those skilled in the art who understand the spirit of the present disclosure will be able to easily suggest other embodiments by modifying, changing, deleting or adding components within the scope of the same spirit, but this will also be considered to fall within the spirit of the present disclosure.

What is claimed is:

1. A water tank, comprising:

a tank body having a tank body space formed therein;

a tank cover configured to cover the tank body space and be coupled with the tank body; and a tank cover reinforcing part formed on the tank cover to reinforce rigidity of the tank cover, wherein the tank cover comprises a tank cover surface formed to be rounded so as to be convex in a direction opposite to the tank body space, and wherein the tank cover reinforcing part is formed to protrude on the tank cover surface.

2. The water tank of claim 1, wherein the tank cover surface is formed to have a length in one direction and a width in the other direction, and wherein the tank cover reinforcing part comprises a plurality of first tank cover reinforcing parts that are positioned at each corner of the one direction and the other direction of the tank cover surface.

3. The water tank of claim 2, wherein the tank cover surface comprises a pair of corners that extend in the one direction and another pair of corners that are continuous with the one pair of corners and extend in the other direction, and wherein the first tank cover reinforcing part is provided in two pairs, and each of the pair of corners and the other pair of corners are arranged adjacent to each other at a plurality of consecutive positions.

4. The water tank of claim 3, wherein the first tank cover reinforcing part is formed such that a width thereof decreases in a direction toward a center of the tank cover at the plurality of locations.

5. The water tank of claim 2, wherein the first tank cover reinforcing part is formed to protrude outwardly from the tank cover surface so as to be convex in a direction opposite to the tank body space.

6. The water tank of claim 1, wherein the tank cover surface is formed to have a length in one direction and a width in the other direction, and wherein the tank cover reinforcing part comprises a plurality of second tank cover reinforcing parts that are positioned at each corner of the one direction of the tank cover surface.

7. The water tank of claim 6, wherein the second tank cover reinforcing part is formed to protrude outwardly from the tank cover surface so as to be convex in a direction opposite to the tank body space.

8. The water tank of claim 6, wherein the second tank cover reinforcing part is provided in a pair, and the pair of second tank cover reinforcing parts are positioned adjacent to a center of each corner of the one direction of the tank cover surface.

9. The water tank of claim 1, wherein the tank cover reinforcing part comprises a third tank cover reinforcing part that is formed to protrude toward the tank body space on one side facing the tank body space among each side of the tank cover surface.

10. The water tank of claim 1, wherein the tank body comprises a tank body bottom surface facing the tank cover surface with the tank body space therebetween, and wherein the tank body bottom surface is formed to be rounded so as to be convex in a direction opposite to the tank body space.

11. The water tank of claim 10, further comprising:

a tank body reinforcing part formed on the tank body to reinforce rigidity of the tank body, wherein the tank body reinforcing part is formed to protrude from the tank body bottom surface.

12. The water tank of claim 11, wherein the tank body reinforcing part comprises a second tank body reinforcing part that is formed to protrude toward the tank body space on one side facing the tank body space among each side of the tank body bottom surface.

13. The water tank of claim 10, further comprising:

a tank body reinforcing part formed on the tank body to reinforce rigidity of the tank body, wherein the tank body comprises a tank body side surface that extends at a predetermined angle with the tank body bottom surface and surrounds the tank body space, and wherein the tank body reinforcing part is formed to protrude on the tank body side surface.

14. The water tank of claim 13, wherein the tank body reinforcing part comprises a first tank body reinforcing part that is formed to protrude in opposition to the tank body space.

15. The water tank of claim 14, wherein the tank body side surface comprises a pair of surfaces that extend in one direction and another pair of surfaces that are continuous with the pair and extend in the other direction, and wherein the first tank body reinforcing part is formed on each of the pair of surfaces and extends in the one direction.

* * * * *